US011477876B2

(12) United States Patent
Mauchle et al.

(10) Patent No.: US 11,477,876 B2
(45) Date of Patent: Oct. 18, 2022

(54) HIGH VOLTAGE RESISTOR ARRANGEMENT, ELECTRODE ARRANGEMENT HAVING SUCH A HIGH VOLTAGE RESISTOR ARRANGEMENT, METHOD FOR MANUFACTURING A HIGH VOLTAGE RESISTOR ARRANGEMENT AND IONIZATION

(71) Applicant: GEMA SWITZERLAND GMBH, St. Gallen (CH)

(72) Inventors: Felix Mauchle, Abtwil (CH); Michael Nagel, Constance (DE)

(73) Assignee: GEMA SWITZERLAND GMBH, St. Gallen (CH)

( * ) Notice: Subject to any disclaimer, the term of this patent is extended or adjusted under 35 U.S.C. 154(b) by 312 days.

(21) Appl. No.: 16/871,786

(22) Filed: May 11, 2020

(65) Prior Publication Data

US 2020/0359488 A1    Nov. 12, 2020

(30) Foreign Application Priority Data

May 10, 2019  (DE) .......................... 102019112335.6

(51) Int. Cl.
*H05F 3/04* (2006.01)
*H01C 1/01* (2006.01)
(Continued)

(52) U.S. Cl.
CPC ................. *H05F 3/04* (2013.01); *H01C 1/01* (2013.01); *H01C 13/02* (2013.01); *H01G 2/02* (2013.01)

(58) Field of Classification Search
CPC .. H01C 1/01; H01C 13/02; H05F 3/04; H01G 2/02
See application file for complete search history.

(56) References Cited

U.S. PATENT DOCUMENTS 2,474,988 A * 7/1949 Sargrove .................. H05K 1/16
427/427
3,624,466 A * 11/1971 Schnable .......... H01L 21/31662
257/E21.285
(Continued)

FOREIGN PATENT DOCUMENTS

DE    2713334 A1    9/1978
DE    3905799 A1    9/1990
(Continued)

OTHER PUBLICATIONS

DE3905799 (same as EP0384022), Domschat, machine translation. (Year: 1990).*
(Continued)

*Primary Examiner* — Kyung S Lee
(74) *Attorney, Agent, or Firm* — Kinney & Lange, P.A.

(57) ABSTRACT

A high voltage resistor arrangement has a rod-shaped supporting substrate made of electrically insulating material and a plurality of individual resistors and/or discrete capacitors spaced apart from each other in the longitudinal direction of the supporting substrate, wherein at least one conductive path extending in the longitudinal direction of the supporting substrate is formed on the supporting substrate which is galvanically connected to the individual resistors and/or discrete capacitors, and wherein the individual resistors and/or discrete capacitors are realized as SMD components soldered directly onto the supporting substrate by means of solder pads.

12 Claims, 3 Drawing Sheets

(51) Int. Cl.
*H01C 13/02* (2006.01)
*H01G 2/02* (2006.01)

(56) References Cited

U.S. PATENT DOCUMENTS

| | | | | |
|---|---|---|---|---|
| 4,048,667 | A * | 9/1977 | Brennecke | H05F 3/04 |
| | | | | 361/213 |
| 4,502,091 | A * | 2/1985 | Saurenman | A01K 45/00 |
| | | | | 361/231 |
| 5,034,651 | A * | 7/1991 | Domschat | H01J 1/304 |
| | | | | 313/309 |
| 6,330,146 | B1 * | 12/2001 | Blitshteyn | H05F 3/04 |
| | | | | 361/220 |
| 10,476,240 | B2 * | 11/2019 | Domschat | B41F 13/02 |
| 2009/0213553 | A1 * | 8/2009 | Tschirbs | H01L 23/3735 |
| | | | | 361/728 |
| 2013/0140649 | A1 * | 6/2013 | Rogers | H01L 31/08 |
| | | | | 438/48 |

FOREIGN PATENT DOCUMENTS

| | | |
|---|---|---|
| DE | 60018049 T2 | 3/2005 |
| DE | 60018049 T2 | 1/2006 |
| DE | 102006005670 A1 | 8/2007 |

OTHER PUBLICATIONS

First German Office Action dated Mar. 3, 2020, for corresponding German Application No. 10 2019 112 335.6.
First German Office Action dated Jul. 20, 2022 received for German Application No. 10 2019 112 335.6, 4 pages.

\* cited by examiner

HIGH VOLTAGE RESISTOR ARRANGEMENT, ELECTRODE ARRANGEMENT HAVING SUCH A HIGH VOLTAGE RESISTOR ARRANGEMENT, METHOD FOR MANUFACTURING A HIGH VOLTAGE RESISTOR ARRANGEMENT AND IONIZATION

CROSS-REFERENCE TO RELATED APPLICATION(S)

This application claims priority to German Application No. 10 2019 112 335.6, filed May 10, 2019, for "HIGH VOLTAGE RESISTOR ARRANGEMENT, ELECTRODE ARRANGEMENT HAVING SUCH A HIGH VOLTAGE RESISTOR ARRANGEMENT, METHOD FOR MANUFACTURING A HIGH VOLTAGE RESISTOR ARRANGEMENT AND IONIZATION DEVICE" by Felix Mauchle and Michael Nagel, which is incorporated by reference herein in its entirety.

BACKGROUND

The present disclosure relates in general to the field of manufacturing high voltage electrode arrangements which are used as discharging or charging electrodes in a wide variety of applications.

Such high voltage electrodes are known in a wide variety of various implementations and arrangements. Thereby common to all of the implementations is different, electrically conductive interconnected, preferably soldered, components being incorporated into an insulating body.

Printed publication DE 2 713 334 A1, for example, makes known the incorporating of individual high voltage resistors having emission tips into an insulating body such that the discrete insulating tips can transfer a charge by corona discharge.

Manufacture of the high voltage electrode arrangements known from the prior art is relatively complex since the individual components such as, for example, high voltage resistors, emission tips and connecting elements, are either built directly into an insulating body manually or first assembled into a semi-finished product to then be integrated into the insulating body. The connection between the individual components of an electrode arrangement constructed in accordance with the prior art is usually effected by crimping, screwing or preferably soldering. The resulting manually created connections of the individual components to one another, or the assembling of semi-finished products and their incorporation into an insulating body respectively, represent the most cost-intensive portion of the high voltage electrode arrangements known from the prior art.

Further known from the prior art are high voltage electrodes having a plurality of individual electrodes arranged parallel to one another and electrically connected by groups or all together. These high voltage electrodes can in particular comprise an elongated, elastically pliable strip made of an electrically insulating material, whereby the individual electrodes are arranged perpendicular to the longitudinal extension of the strip and their electrode tips protrude over a longitudinal edge of the strip, wherein an electrical conductor is longitudinally positioned on at least one flat side of the strip.

The disadvantage of these high voltage electrode arrangements commonly known from the prior art is particularly to be seen in that the individual electrical components, such as in particular the individual resistors associated with the electrode tips, need to be galvanically contacted to the electrical conductor on the flexible strip manually, and in particular soldered. This manual placement is relatively time-consuming. Moreover, the grid to the electrode tips is often quite imprecise due to the manual placement and a great deal of time is required to realize the aligning of the individual electrode tips during the fitting of the high voltage electrode. A further disadvantage is to be seen in that, due to the required manual placement, the elastically pliable strip with the electrical conductor positioned on the strip is quite difficult to clean, which is however necessary in order to ensure a secure galvanic coupling of the electrode tips and the electrical conductor of the elastically pliable strip.

Based on the aforementioned problem, the present disclosure addresses the task of specifying a high voltage resistor arrangement for an electrode arrangement of an ionization device able to be manufactured with as little effort as possible, whereby optimal electrode tip alignment is simultaneously achievable.

SUMMARY

The present disclosure provides a high voltage resistor arrangement having a rod-shaped supporting substrate made of electrically insulating material and a plurality of individual resistors and/or discrete capacitors spaced apart from each other in the longitudinal direction of the supporting substrate, wherein at least one conductive path extending in the longitudinal direction of the supporting substrate is formed on the supporting substrate which is galvanically connected to the individual resistors and/or discrete capacitors. According to the present disclosure, it is in particular provided for the individual resistors and/or discrete capacitors to be realized as surface mount device (SMD) components soldered directly onto the supporting substrate by means of solder pads.

The present disclosure is based on the general idea of realizing the high voltage resistor arrangement as a PCB board, whereby the individual resistors or discrete capacitors respectively are no longer positioned on the supporting substrate (PCB board) by hand but rather soldered directly onto the supporting substrate via conductive pads. So doing enables fully automatic placement by an automatic placement machine. Moreover, the grid between the supporting substrate's longitudinally spaced individual resistors and/or discrete capacitors is very exact.

The conductive path extending in the longitudinal direction of the supporting substrate can for example be printed onto the supporting substrate. Alternatively thereto, it is conceivable for the conductive path to be applied to the supporting substrate by means of a photochemical process.

The supporting substrate is preferably implemented as a PCB board and consists for example of a fiber-reinforced plastic material. In a more economical variant, the supporting substrate can be made of laminated paper.

The supporting substrate is in particular realized relatively rigidly, which simplifies the final assembly of the high voltage resistor arrangement and in particular makes alignment of the electrode tips connected to the high voltage resistor arrangement unnecessary during final assembly.

According to embodiments of the disclosed high voltage resistor arrangement, each individual resistor and/or each discrete capacitor is allocated to a connection area integrally formed with the supporting substrate which preferably protrudes in a radial direction from the longitudinal direction of the supporting substrate and on which the respective individual resistor and/or the respective discrete capacitor is arranged. It is thereby preferably provided for a respective individual resistor and/or respective discrete capacitor to be disposed on each connection area, wherein a SMD ceramic resistor is arranged on each connection area in preferential realizations.

A first connecting conductive path can be allocated to each individual resistor and/or each discrete capacitor via which the individual resistor and/or discrete capacitor is galvanically connected to the conductive path extending in longitudinal direction of the supporting substrate. Preferably, a second connecting conductive path is allocated to each individual resistor and/or each discrete capacitor via which the individual resistor/discrete capacitor is galvanically connected to a conductor pad for an electrode tip. The first and second conductive path are preferably applied to the supporting substrate—as is also the conductive path extending in the longitudinal direction of the substrate—by means of a photochemical process. Same can also be used for the connection areas allocated to the individual resistors and/or discrete capacitors.

The high voltage resistor arrangement can in this way be manufactured fully automatically and the supporting substrate in particular can be fitted fully automatically, particularly by means of a placement machine, such that there is absolutely no manual assembly involved in manufacturing the high voltage resistor arrangement.

According to advantageous further developments of the disclosed high voltage resistor arrangement, a lacquer coating is formed on at least areas of the supporting substrate and the conductive path formed on the supporting substrate.

The supporting substrate can preferably be between 1.0 mm and 2.0 mm thick, whereas a copper material thickness of between 0.025 mm and 0.045 mm suffices for the conductive path. The lacquer coating optionally applied to the supporting substrate and the conductive path can be between 0.005 mm and 0.015 mm thick. Of course, other dimensions are also conceivable for the thickness of the supporting substrate, the thickness of the conductive path and/or the thickness of the optionally provided lacquer coating.

In order to enable a modular structure, embodiments of the present disclosure provide for the supporting substrate to be divided or divisible into multiple supporting substrate sections, each having a prespecified or specifiable defined length. To define the overall length of the high voltage resistor arrangement, a plurality of adjacent supporting substrate sections can then be connected together end-to-end as needed, in particular by soldering and/or other method of connection. The length of the high voltage resistor arrangement can thereby be extended as needed, whereby the high voltage resistor arrangement then consists of a plurality of supporting substrate sections connected together.

The prespecified or specifiable defined length of the supporting substrate sections preferably amounts to 10 cm to 100 cm, and even more preferentially 20 cm to 70 cm, so as to be able to realize high voltage resistor arrangements of differing lengths as flexibly as possible with the supporting substrate sections.

According to a further aspect, the present disclosure relates to an electrode arrangement, for example for an ionization device for reducing or applying electrostatic charge on a moving material web, wherein the electrode arrangement comprises a high voltage resistor arrangement of the aforementioned disclosed type. The electrode arrangement further comprises a plurality of electrode tips. The electrode tips are preferably made from tungsten (pure tungsten or tungsten with a certain content of thorium, zirconium and/or lathane), although other materials, such as for example stainless steel, are of course also possible. One electrode tip is in each case thereby galvanically connected to one of the plurality of resistors or discrete capacitors respectively.

Each resistor and/or each discrete capacitor is preferably allocated a conductor pad in the disclosed electrode arrangement, by means of which the corresponding resistor and/or corresponding discrete capacitor is galvanically connected. Provided in particular is for one respective electrode tip to be galvanically connected to the conductor pad in each case, and that preferably by means of a solder contact or a crimp contact.

According to a further aspect, the present disclosure relates to a method for manufacturing a high voltage resistor arrangement of the disclosed type, in particular for manufacturing an electrode arrangement of the aforementioned type, wherein the method comprises the procedural step of providing a supporting substrate made of an electrically insulating material, the procedural step of forming a conductive path structure on the supporting substrate, and the procedural step of connecting the SMD components to the conductive path structure, and that by the SMD components being soldered directly onto the supporting substrate. The conductive path structure is thereby preferably formed fully automatically, in particular via a photochemical process, whereby the SMD components are preferably fitted to the supporting substrate fully automatically.

A further development of the disclosed method provides for each SMD component to be galvanically connected to an electrode tip, wherein prior to the galvanic connection to the electrode tips, the supporting substrate undergoes fully automatic cleaning of dust and grease in a circuit board cleaning system.

According to a further aspect, the present disclosure relates to an ionization device, in particular in the form of an ionizing bar for non-contact neutralizing of electrostatic charges, particularly of insulating materials, wherein the ionization device comprises a housing for accommodating a cascade insert with a cascade connection, and wherein the housing holds at least one electrode arrangement of the disclosed type. It is thereby in particular provided for an output of the cascade connection to be capacitively, inductively or resistively connected or connectable to the conductive path extending in the longitudinal direction of the supporting substrate of the electrode arrangement.

BRIEF DESCRIPTION OF THE DRAWINGS

The following will reference the accompanying drawings in describing the present disclosure in greater detail.

DETAILED DESCRIPTION

High voltage resistors are used with voltages of approximately 1 kV to 150 kV and have ohmic resistance values of from 100 kΩ to 100 GΩ. Their consumption is thereby usually less than a watt. Depending on the size of the resistor, the power consumption can in principle also be greater than a watt.

Such high voltage resistors are used in particular in electrode arrangements 16 of ionization devices 20 which are utilized to reduce electrical charge or to charge moving material webs. There are usually a large number of electrodes used within such an ionization device 20, whereby each electrode or each electrode tip respectively is allocated its own high voltage resistor 10 or discrete capacitor as a protective resistor or series resistor respectively.

Figure 1:
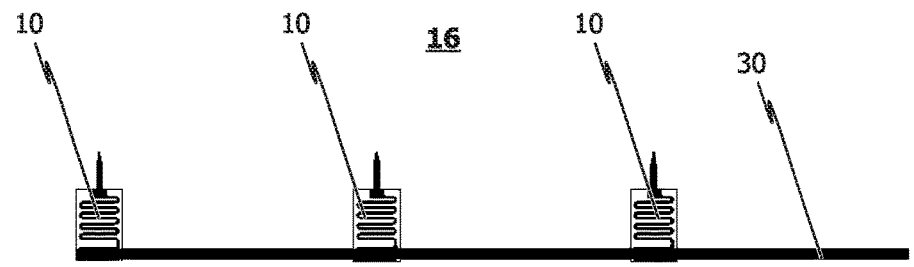
FIG. 1 is a schematic depiction of a conventional electrode arrangement for an ionization device for reducing or applying electrostatic charge on a moving material web as known from the prior art.

FIG. 1 shows a schematic view of a known prior art electrode arrangement 16 for ionization devices 20. This electrode arrangement 16 essentially consists of an elongated, elastically pliable strip on which an electrical conductor is placed, or which can be designed as an electrical conductor respectively, for example as an elastic copper strip. Individual spaced resistors 10 are galvanically connected to the electrical conductor manually. Each individual resistor 10 is allocated an electrode tip, which is likewise galvanically connected to the high voltage resistor 10 by hand, in particular by soldering.

The electrode arrangement 16 known from the prior art and shown schematically in FIG. 1 has the disadvantage of its manufacture being relatively time-consuming, whereby the electrode tip grid is at the same time frequently imprecise due to the manual placement.

Figure 2:
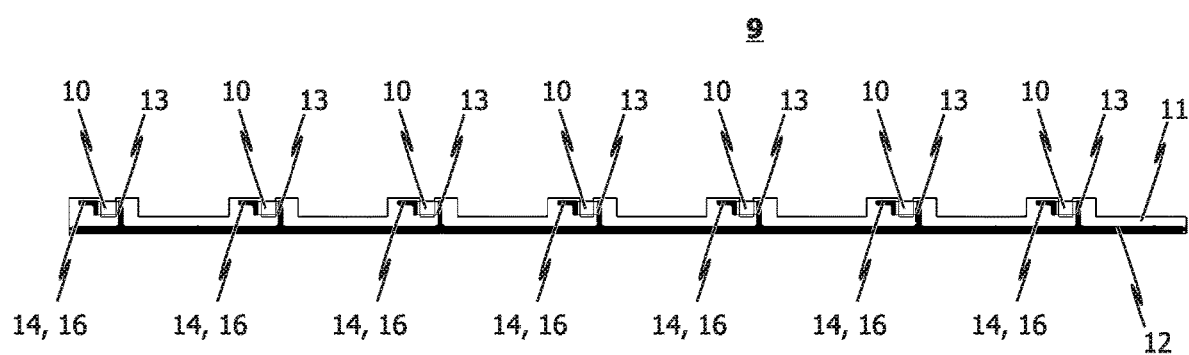
FIG. 2 is a schematic depiction of an exemplary embodiment of a high voltage resistor arrangement for an electrode arrangement, in particular an ionization device.

In order to provide a suitable high voltage resistor arrangement 9, or an electrode arrangement 16 so equipped, one in particular characterized by reduced manufacturing costs and ensuring an optimal electrode tip alignment, it is proposed for the high voltage resistor arrangement 9 to be comprised of, as schematically indicated in FIG. 2, a rod-shaped supporting substrate 11 which is relatively rigid flexurally and which can be realized for example as a PCB board. It is thus in particular conceivable for the supporting substrate 11 to be made from a fiber-reinforced plastic material or, alternatively thereto, laminated paper.

The high voltage resistor arrangement 9, as schematically shown in FIG. 2, further comprises a plurality of individual resistors 10 at a spacing from one another in the longitudinal direction of the supporting substrate 11 as well as a conductive path 12 extending in the longitudinal direction of the supporting substrate 11 formed on said supporting substrate 11. The conductive path 12 formed on the supporting substrate 11 is galvanically connected to the individual resistors 10.

Particularly provided by the present disclosure is for the individual resistors 10 to be realized as SMD components directly soldered onto the supporting substrate 11 by means of conductive conductor pads.

As can be gathered from the depiction in FIG. 2, it is particularly conceivable in this context for each individual resistor 10 to be allocated a connection area protruding in a radial direction from the longitudinal direction of the supporting substrate 11, which is integrally formed with the supporting substrate 11 and on which the respective individual resistor 10 is arranged. A SMD ceramic resistor 10 is thereby preferably arranged on each connection area.

The exemplary embodiment of the disclosed high voltage resistor arrangement 9 according to FIG. 2 further provides for a first connecting conductive path 13 to be allocated to each individual resistor 10 via which the individual resistor 10 is galvanically connected to the conductive path 12 extending in the longitudinal direction of the supporting substrate 11. It is furthermore provided for a second connecting conductive path 14 to be allocated to each individual resistor 10 via which the individual resistor 10 is galvanically connected to a conductor pad for an electrode tip (not shown in FIG. 2).

The conductive path 12 extending in the longitudinal direction of the supporting substrate 11, the first and second connecting conductive paths 13, 14 and the connection areas 15 of the high voltage resistor arrangement 9 are preferably applied fully automatically to the supporting substrate 11 via a photochemical process.

Figure 3:
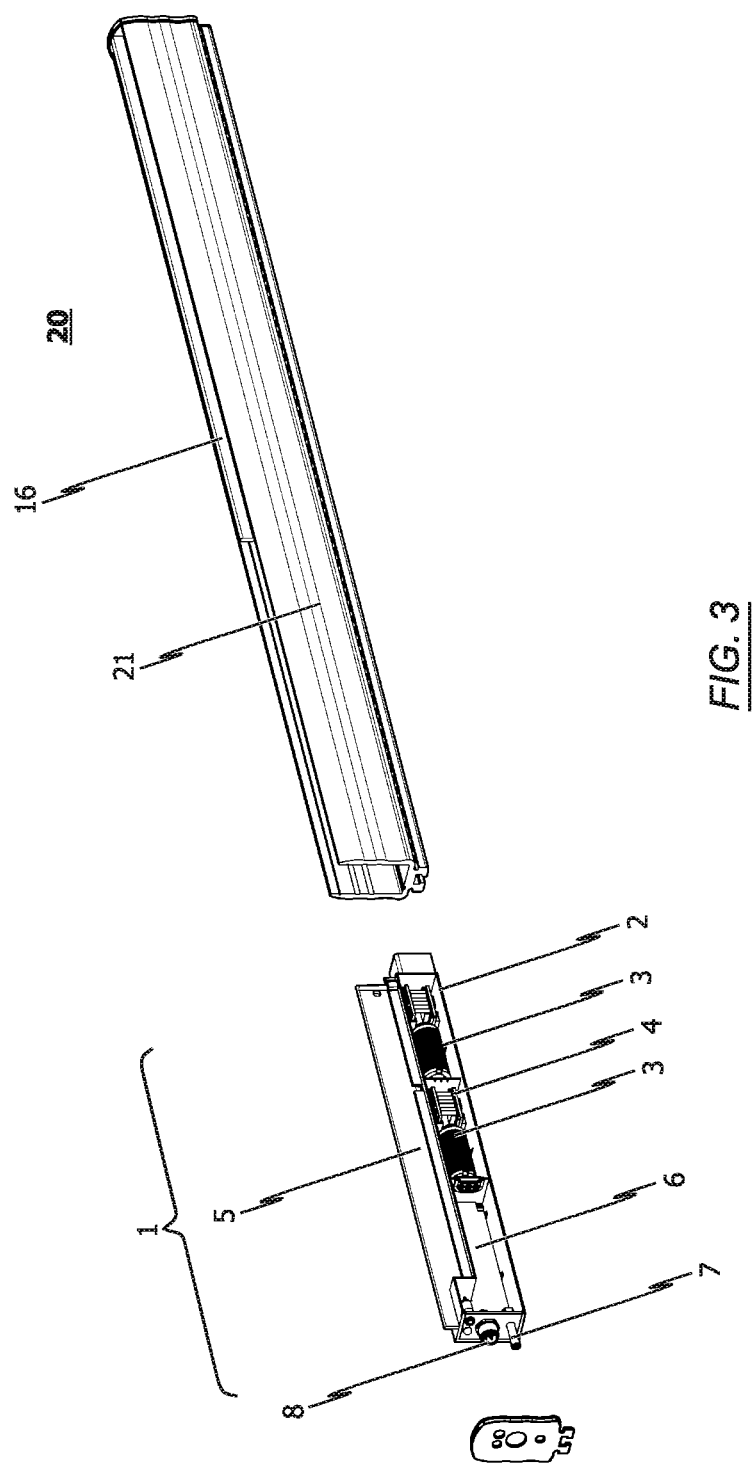
FIG. 3 is a schematic depiction in an isometric, partly sectional exploded view of an exemplary embodiment of an ionization device designed as an ionizing bar according to the present disclosure.

FIG. 3 shows a schematic depiction in isometric, partly sectional exploded view of an exemplary embodiment of an ionization device 20 realized as an ionizing bar, which in particular serves for non-contact neutralizing of electrostatic charges, particularly of insulating materials, and which has an electrode arrangement 16 comprising the disclosed high voltage resistor arrangement 9.

The exemplary embodiment of the disclosed ionizing bar 20 is particularly suitable for the non-contact neutralizing of electrostatic charges and/or for the selective charging (either positive or negative) of in particular insulating materials. The ionizing bar 20 has an outer housing 21, for example in the form of a partially open profile. A cascade insert 1 is preferably replaceably accommodated in at least part of the outer housing 21.

It is thereby particularly provided for the outer housing 21 with the cascade insert 1 accommodated in at least part of said outer housing 21 to be mountable transverse to the direction of movement of a substrate to be treated (not depicted in the drawings).

The disclosed ionizing bar 20 is particularly suitable as an antistatic device for reducing electrostatic charges on moving material webs. It is particularly characterized by its easier handling, improved usability as well as reduced dimensions. To that end, all the components of the ionizing bar 20 necessary to operation are integrated into the cascade insert 1, which is or can be accommodated, preferably replaceably, in the outer housing 21 of the ionizing bar 20.

The cascade insert 1 is in particular a modularly structured insert able to be flexibly introduced and/or replaced in an ionizing bar 20. The embodiment shown in FIG. 3 provides for two cascade connections 3 arranged one behind the other in the housing 2 of the cascade insert 1 in the longitudinal direction of said housing 2, each cast in potting compound 4.

Further provided is for control electronics 6, preferably in the form of a modularly structured block, to be accommodated in the housing 2 of the cascade insert 1 to suitably control the at least one cascade connection 3 of the cascade insert 1. It thereby makes sense for the control electronics 6 to preferably be provided in an end region of the housing 2 of the cascade insert 1 and adjacent to one of the at least one cascade connections 3. Conceivable in this context is then for the support 5 of the cascade insert 1, by which the disclosed electrode arrangement 16 with the high voltage resistor arrangement 9 is accommodated, to extend in the longitudinal direction of the housing 2 over at least part of the end region of the housing 2 accommodating the control electronics 6.

It is further provided for at least one electrical connection 7 for the power supply of the at least one cascade connection 3 and at least one data interface 8 for data communication with the control electronics 6 to be provided, preferably at an end face of an end region of the housing 2 accommodating the control electronics 6. The at least one data interface 8 and the control electronics 6 are thereby preferably designed for bidirectional communication, in particular via a CAN bus.

Additionally thereto, the cascade insert 1 comprises an interface for manually entering control commands to the control electronics 6 at an end face of the end region of the housing 2 accommodating the control electronics 6. Additionally or alternatively thereto, it is of advantage for a display device to be provided, likewise preferably in the end face of the end region of the housing 2 accommodating the control electronics 6, particularly in the form of at least one LED and/or in the form of a display for visually outputting information to the user of the cascade insert 1.

Figure 4:
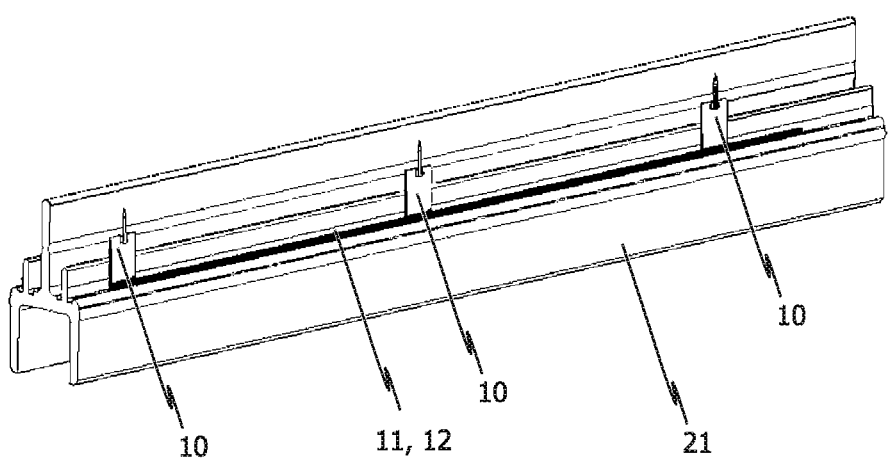
FIG. 4 is a schematic depiction in an isometric view of a housing of a further embodiment of an ionization device designed in particular in the form of an ionizing bar according to the present disclosure.

FIG. 4 shows a housing 21 of an ionization device 20 realized as an ionizing bar in a schematic and isometric view, whereby the housing 21 can accommodate a cascade insert or cascade connection 3. As FIG. 4 indicates, the housing 21 holds an electrode arrangement 16 of the disclosed type. The electrode arrangement 16 comprises a high voltage resistor arrangement 9 as per FIG. 2 as well as a plurality of electrode tips made in particular of tungsten, wherein one electrode tip is in each case galvanically connected to one of the multiple resistors 10 of the high voltage resistor arrangement 9.

Conceivable in this context, for example, is for each resistor 10 of the high voltage resistor arrangement 9 to be allocated a conductor pad via which the respective resistor 10 is galvanically connected, whereby a respective electrode tip is galvanically connected to the conductor pad, preferably by means of a solder contact or a crimp contact.

The present disclosure is not limited to the exemplary embodiments shown in the drawings but rather yields from an integrated overall consideration of all the features disclosed herein.

LIST OF REFERENCE NUMERALS 1 cascade insert
2 cascade insert housing
3 cascade connection
4 potting compound
5 support
6 control electronics
7 connection
8 data interface
9 high voltage resistor arrangement
10 individual resistor
11 supporting substrate
12 conductive path extending in the longitudinal direction of supporting substrate 11
13 first connecting conductive path
14 second connecting conductive path
15 connection area
16 electrode arrangement
20 ionization device/ionizing bar
21 outer housing of ionization device/ionizing bar
30 flexible strip

What is claimed is:
1. A high voltage resistor arrangement comprising:
a rod-shaped supporting substrate made of electrically insulating material; and
a plurality of individual resistors and/or discrete capacitors spaced apart from each other in a longitudinal direction of the supporting substrate,
wherein at least one conductive path extending in the longitudinal direction of the supporting substrate is formed on the supporting substrate which is galvanically connected to the individual resistors and/or discrete capacitors,
wherein the individual resistors and/or discrete capacitors are realized as surface mount device (SMD) components soldered directly onto the supporting substrate by means of solder pads,
wherein a lacquer coating is formed on at least some areas of the supporting substrate and the at least one conductive path formed on the supporting substrate, and
wherein the supporting substrate has a thickness between 1.0 mm and 2.0 mm, wherein the at least one conductive path has a thickness between 0.025 mm and 0.045 mm, and wherein the lacquer coating has a thickness between 0.005 mm and 0.015 mm.

2. The high voltage resistor arrangement according to claim 1,
wherein each individual resistor and/or each discrete capacitor is allocated to a connection area integrally formed with the supporting substrate which protrudes in a radial direction from the longitudinal direction of the supporting substrate and on which the individual resistor and/or respective discrete capacitor is arranged.

3. The high voltage resistor arrangement according to claim 2,
wherein the plurality of individual resistors and/or discrete capacitors comprises a SMD ceramic resistor arranged on each connection area.

4. The high voltage resistor arrangement according to claim 1, wherein each individual resistor and/or each discrete capacitor is allocated a first connecting conductive path via which the individual resistor and/or discrete capacitor is galvanically connected to the at least one conductive path extending in the longitudinal direction of the supporting substrate, and wherein each individual resistor and/or each discrete capacitor is allocated a second connecting conductive path via which the individual resistor and/or discrete capacitor is galvanically connected to a conductor pad for an electrode tip.

5. The high voltage resistor arrangement according to claim 4, wherein the at least one conductive path extending in the longitudinal direction of the supporting substrate and/or the first and second conductive paths and/or the connection areas is applied to the supporting substrate by means of a photochemical process.

6. The high voltage resistor arrangement according to claim 1, wherein the supporting substrate is formed from a fiber-reinforced plastic material or from laminated paper.

7. The high voltage resistor arrangement according claim 1,
wherein the supporting substrate is divided into multiple supporting substrate sections, each having a prespecified or specifiable defined length, wherein to define an overall length of the high voltage resistor arrangement, a plurality of adjacent supporting substrate sections are connected or connectable together end-to-end, by soldering and/or another method of connection.

8. An electrode arrangement for an ionization device for reducing or applying electrostatic charge on a moving material web, wherein the electrode arrangement comprises:
a high voltage resistor arrangement according to claim 1; and
a plurality of electrode tips comprising tungsten or stainless steel,
wherein each electrode tip is galvanically connected to a respective one of the plurality of individual resistors and/or discrete capacitors.

9. The electrode arrangement according to claim 8,
wherein each individual resistor and/or each discrete capacitor is allocated a conductor pad, by means of which the resistor and/or discrete capacitor is galvanically connected, and wherein a respective electrode tip is galvanically connected to the conductor pad, by means of a solder contact or a crimp contact.

10. A method for manufacturing a high voltage resistor arrangement according to claim 1, wherein the method comprises:
providing the supporting substrate made of an electrically insulating material;
forming a conductive path structure on the supporting substrate that includes the at least one conductive path extending in the longitudinal direction of the supporting substrate; and
connecting the SMD components to the conductive path structure, by soldering the SMD components directly onto the supporting substrate,
wherein the conductive path structure is formed fully automatically via a photochemical process, and
wherein the SMD components are fitted to the supporting substrate fully automatically.

11. The method according to claim 10,
wherein each SMD component is galvanically connected to an electrode tip, and
wherein prior to galvanic connection to the electrode tips, the supporting substrate is automatically cleaned of dust and grease in a circuit board cleaning system.

12. An ionization device, in the form of an ionizing bar for non-contact neutralizing of electrostatic charges of insulating materials, wherein the ionization device comprises:
a housing for accommodating a cascade insert with a cascade connection,
wherein the housing holds at least one electrode arrangement according to claim 8, and
wherein an outlet of the cascade connection is capacitively, inductively or resistively connected or connectable to the at least one conductive path extending in the longitudinal direction of the supporting substrate of the electrode arrangement.

* * * * *